(12) United States Patent
Mylchreest et al.

(10) Patent No.: US 9,486,727 B2
(45) Date of Patent: Nov. 8, 2016

(54) CYCLONE SEPARATOR

(75) Inventors: George D. Mylchreest, North Granby, CT (US); Jean-Claude Semedard, Paris (FR); Pierre Gauville, Verrieresle Buisson (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 345 days.

(21) Appl. No.: 13/824,960

(22) PCT Filed: Aug. 22, 2011

(86) PCT No.: PCT/US2011/048598
§ 371 (c)(1),
(2), (4) Date: Apr. 16, 2013

(87) PCT Pub. No.: WO2012/036845
PCT Pub. Date: Mar. 22, 2012

(65) Prior Publication Data
US 2013/0205731 A1    Aug. 15, 2013

(30) Foreign Application Priority Data

Sep. 17, 2010 (EP) ..................................... 10177470

(51) Int. Cl.
*B01D 45/12* (2006.01)
*B01D 45/16* (2006.01)
(Continued)

(52) U.S. Cl.
CPC ............... *B01D 45/16* (2013.01); *B01D 45/12* (2013.01); *B04C 5/04* (2013.01); *B04C 5/081* (2013.01); *B04C 5/13* (2013.01)

(58) Field of Classification Search
CPC ................................ B01D 45/16; B01D 45/12
USPC ................................................. 55/447, 459.1
See application file for complete search history.

(56) References Cited

U.S. PATENT DOCUMENTS 5,771,844 A    6/1998  Dietz
6,258,146 B1 *  7/2001  Semedard .................... 55/459.3
(Continued)

FOREIGN PATENT DOCUMENTS

CN    2062412    9/1990
CN    2434066    6/2001
(Continued)

OTHER PUBLICATIONS

European Search Report, European Searching Authority, European Application No. 10177470, Munich, Feb. 23, 2011.
(Continued)

*Primary Examiner* — Dung H Bui
(74) *Attorney, Agent, or Firm* — GE Global Patent Operation; Stephen G. Midgley

(57) ABSTRACT

A cyclone separator that collects entrained solid particles from a gas stream, comprising a cylindrical body, an inlet duct connected to the body, and a gas outlet tube connected to the body at its upper end. The ratio of the distance between the parallel to a face dropped from the tip of the cyclone separator and the closest point of the gas outlet tube to the internal diameter of the body is at least 0.1, as measured at the lower extremity of the gas outlet tube. The ratio of the inlet duct area, measured at the tip of the cyclone separator and perpendicularly to the face, to the cross-sectional area of the body, is between 0.24 and 0.32. The ratio of the height of the inlet duct to the width of the inlet duct at the tip of the cyclone separator does not exceed 4.

18 Claims, 1 Drawing Sheet

(51) Int. Cl.
  *B04C 5/04*   (2006.01)
  *B04C 5/081*  (2006.01)
  *B04C 5/13*   (2006.01)

(56) References Cited

U.S. PATENT DOCUMENTS

| | | |
|---|---|---|
| 6,322,301 B1 | 11/2001 | Semedard et al. |
| 6,322,601 B1 | 11/2001 | Semedard et al. |
| 6,938,780 B2* | 9/2005 | Baglione et al. ............ 209/717 |
| 8,834,800 B2* | 9/2014 | Erler et al. .................... 422/147 |
| 2005/0126394 A1 | 6/2005 | Reiling |
| 2006/0226055 A1 | 10/2006 | Castro Soto |

FOREIGN PATENT DOCUMENTS

| | | |
|---|---|---|
| DE | 19606647 A1 | 9/1996 |
| EP | 1020229 A1 | 7/2000 |

OTHER PUBLICATIONS

International Search Report and Written Opinion, International Searching Authority, PCT Application No. PCT/US11/48598, Search Completed Dec. 26, 2011, Authorized Officer Lee W. Young.

Metallgesellschaft AG, German Patent Application No. 19606647 A1 English language abstract, Sep. 19, 1996.

* cited by examiner

CYCLONE SEPARATOR

This is a US National Phase application claiming priority to European Application No. 10177470.1 filed having a Filing Date of Sep. 17, 2010, incorporated herein in its entirety by reference.

TECHNICAL FIELD

The invention is related to a cyclone separator, and is more particularly directed to a cyclone separator for circulating fluidized bed (CFB) boilers.

BACKGROUND

The circulating fluidized bed boilers require the capture of the particles that are entrained out of a reactor by reactor gases and their separation from the gases in order to recirculate it into said reactor for complete reaction.

The separation is usually made by means of cyclone separators. Cyclonic separation is a method of removing particulates from gases, without the use of filters, through vortex separation. Rotational effects and gravity are used to separate mixtures of solids and gases.

The capture efficiency of the smallest particles is a key issue.

It is known that reducing the diameter of the cyclone separator thus increasing the axial mean velocity in the cyclone body while keeping the same similitude ratio leads to a strong increase of the pressure drop across the cyclone and finally to a decrease of the capture efficiency when trying to keep the pressure drop at a constant limited value by keeping nearly constant the inlet section of the gas-solids entrance into the cyclone. Such types of cyclones having a reduced shape ratio but a nearly constant inlet gas/solids entrance section dimensions to get the same pressure drop as the base cyclone operating at 6 m/s could be qualified as "similar" for the purpose of the comprehension.

Most of the cyclone separators that are currently used in circulating fluidized bed boilers exhibit a good collection efficiency for body mean axial velocity of about 5 to 6 m/s. However, the "similar" cyclone separators, when used at a body mean axial velocity of above 7 m/s lead to a degraded capture efficiency. Thus, it is not possible to use "similar" cyclones if the cyclone collection efficiency of the cyclones operating at 8 m/s is required to be the same as the collection efficiency of the cyclones operating at 6 m/s and some changes have to be invented.

Document U.S. Pat. No. 5,771,844 discloses a cyclone separator able to operate at a body mean axial velocity of 8 m/s with a capture efficiency which is similar to the efficiency of the cyclone separators that are efficient for an axial mean velocity of 6 m/s.

U.S. Pat. No. 5,771,844 discloses that the ratio height/depth of the opening of the cyclone separator inlet is at least 4/1.

This cyclone separator suffers the shortcoming that it makes the inlet duct more costly due to the stiffening needs of the unusually wide vertical dimension. In addition, the cyclone barrel is higher in order to locate the high vertical dimension of the opening. Thus, the cyclone separator body is more expensive than for lower ratios. Moreover, the total height of such a cyclone impacts detrimentally the arrangement of the whole system.

SUMMARY

An object of the present invention is to provide a cyclone separator in such a manner to solve the above described problems.

The object mentioned above is accomplished by a cyclone separator for particle collection from a gas stream containing entrained solid particles, said cyclone separator comprising:
- a cylindrical-shaped body portion,
- an inlet duct having an intrados face and an extrados face, and which is connected to the body portion,
- a gas outlet tube connected to the body portion at its upper end.

According to the invention:
- the ratio (d/D) of the distance (d) between the parallel to the extrados face dropped from the tip of the cyclone separator and the closest point of the gas outlet tube to the internal diameter (D) of the body portion is superior or equal to 0.1, said distance (d) being measured at the lower extremity of the gas outlet tube,
- the ratio (s/S) of the inlet duct area (s), measured at the tip of the cyclone separator and perpendicularly to the extrados face, to the cross-sectional area (S) of the body portion, is comprised between 0.24 and 0.32, and
- the ratio (h/w) of the height (h) of the inlet duct to the width (w) of the inlet duct at the tip of the cyclone separator does not exceed 4, and can be for instance less than 4.

The ratio (d/D) of the distance (d) between the parallel to the extrados face dropped from the tip of the cyclone separator and the closest point of the gas outlet tube to the internal diameter (D) of the body portion is preferably comprised between 0.1 and 0.2, more preferably between 0.1 and 0.15 and even more preferably between 0.12 and 0.15.

The ratio (h/w) of the height (h) of the inlet duct to the width (w) of the inlet duct at the tip of the cyclone separator is preferably comprised between 3 and 4, and more preferably between 3.5 and 4.

For instance, different associations of the ratios d/D, s/S and h/w that can be carried out are mentioned in Table 1.

TABLE 1

| d/D | s/S | h/w |
|---|---|---|
| ≥0.1 | 0.24-0.32 | ≤4 |
| ≥0.1 | 0.26-0.30 or 0.27-0.29 | ≤4 |
| 0.1-0.2 | 0.24-0.32 | ≤4 |
| 0.1-0.2 | 0.26-0.30 or 0.27-0.29 | ≤4 |
| 0.1-0.15 | 0.24-0.32 | ≤4 |
| 0.1-0.15 | 0.26-0.30 or 0.27-0.29 | ≤4 |
| 0.12-0.15 | 0.24-0.32 | ≤4 |
| 0.12-0.15 | 0.26-0.30 or 0.27-0.29 | ≤4 |
| ≥0.1 | 0.24-0.32 | 3-4 |
| ≥0.1 | 0.26-0.30 or 0.27-0.29 | 3-4 |
| 0.1-0.2 | 0.24-0.32 | 3-4 |
| 0.1-0.2 | 0.26-0.30 or 0.27-0.29 | 3-4 |
| 0.1-0.15 | 0.24-0.32 | 3-4 |
| 0.1-0.15 | 0.26-0.30 or 0.27-0.29 | 3-4 |
| 0.12-0.15 | 0.24-0.32 | 3-4 |
| 0.12-0.15 | 0.26-0.30 or 0.27-0.29 | 3-4 |
| ≥0.1 | 0.24-0.32 | 3.5-4 |
| ≥0.1 | 0.26-0.30 or 0.27-0.29 | 3.5-4 |
| 0.1-0.2 | 0.24-0.32 | 3.5-4 |
| 0.1-0.2 | 0.26-0.30 or 0.27-0.29 | 3.5-4 |
| 0.1-0.15 | 0.24-0.32 | 3.5-4 |
| 0.1-0.15 | 0.26-0.30 or 0.27-0.29 | 3.5-4 |
| 0.12-0.15 | 0.24-0.32 | 3.5-4 |
| 0.12-0.15 | 0.26-0.30 or 0.27-0.29 | 3.5-4 |

The cyclone according to the invention avoids most of the direct leak of small particles from the cyclone entrance to the cyclone exit in the gas outlet tube, thus providing a good cyclone capture efficiency of small particles even for high mean gas axial velocity such as 8 m/s and higher and allowing a reduction of the diameter of the body portion.

The distance between the projection of the body portion centre on a perpendicular to the extrados face and the projection of the gas outlet tube lower extremity centre on a perpendicular to the extrados face can be comprised between 0.04D and 0.08D, D being the internal diameter of the body portion.

The ratio (a/S) of the cross-sectional area (a) of the gas outlet tube lower extremity to the cross-sectional area (S) of the body portion can be comprised between 0.13 and 0.20, and more preferably between 0.15 and 0.20.

Preferably, the height of the inlet duct does not exceed the internal diameter (D) of the body portion.

The height of the body portion can be less than 1.2D, D being the internal diameter of the body portion.

The gas outlet tube can comprise a lower conical portion and an upper cylindrical portion. The inlet orifice of the gas outlet tube can have a lower section than the section of the upper cylindrical portion of the gas outlet tube.

The diameter ($D_v$) of the cylindrical portion and the diameter ($d_v$) at the lower part of the conical portion can be such that $0 \leq D_v - d_v < 0.3L$, L being the height of the conical portion of the gas outlet tube.

The intrados face ending at the tip of the cyclone separator, said intrados face which connects the starting point of the inlet duct to the point at the tip of the cyclone separator can have a profile such that it comprises at least two distinct tangents so that one intersects the extrados face at a point located upstream of the foot of the perpendicular to the extrados face taken from the tip of the cyclone separator, and said intrados face can start from said point by a first part having a rectilinear profile, followed by a second part having a curved profile with a point of inflection or else by a second rectilinear part which meets the tip of the cyclone separator, said point being located at the exit from the furnace.

The intrados face can have a first part having a rectilinear profile followed by a second rectilinear part and in that the rectilinear profile of the first part makes with the extrados face an angle comprised between 25° and 35° so as to procure a good compromise between separation efficiency (by projecting solids on the extrados face) and pressure drop.

Other features and advantages of the invention will become apparent from the following description of embodiments of the invention given by way of non-limiting examples only, and with reference to the accompanying drawings, in which:

DETAILED DESCRIPTION

Figure 1:
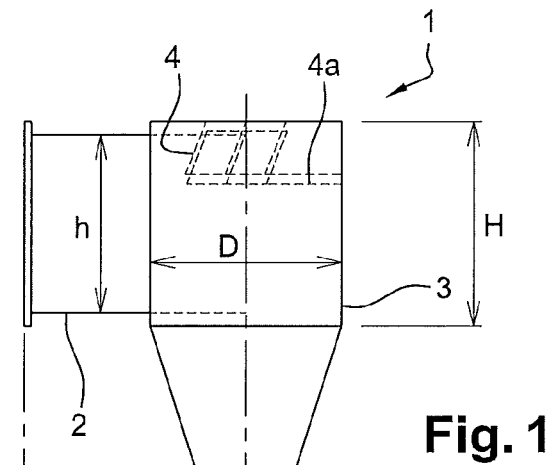
FIG. 1 is a front view of a cyclone separator according to the invention.
Figure 2:
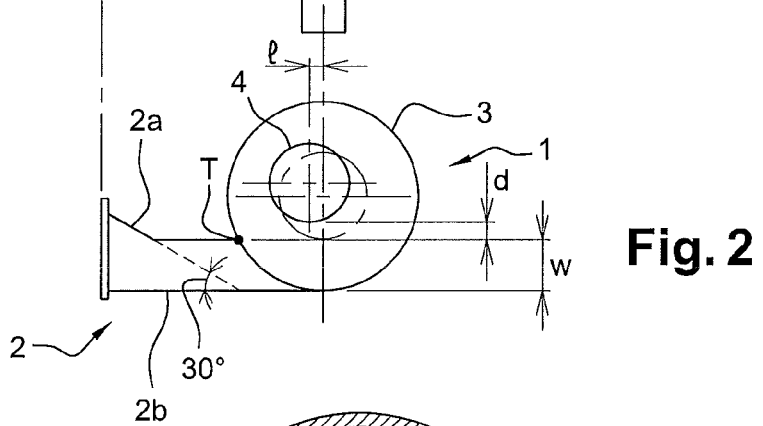
FIG. 2 is a bottom view of the cyclone separator.

As illustrated in FIG. 1 and in FIG. 2, a cyclone separator 1 according to the invention comprises an inlet duct 2, a body portion 3 and a gas outlet tube 4.

The inlet duct 2, through which a mixture of particles and gas enter the cyclone separator 1, may be a rectangular-shaped inlet flow passageway and usually extends partially into the upper portion of a fluidized bed combustion furnace. The inlet duct 2 comprises an intrados face 2a and an extrados face 2b. The intrados face 2a ends at the tip T of the cyclone separator 1.

The inlet duct 2 is connected tangentially onto the cylindrical-shaped body portion or barrel portion 3 of the cyclone separator 1.

The gas outlet tube 4 is a vortex finder that is connected to the body portion 3 at its upper end.

According to the invention, the ratio d/D of the distance d between the parallel to the extrados face 2b dropped from the tip T of the cyclone separator 1 and the closest point of the gas outlet tube 4 to the internal diameter D of the body portion 3 is superior or equal to 0.1. Said distance d is measured at the lower extremity of the gas outlet tube 4, i.e. at the lower level 4a of the gas outlet tube 4. As shown in FIG. 1, the second part of the intrados face 2a that ends at the tip T of the cyclone separator 1 is parallel to the extrados face 2b. It could be also envisaged that the second part of the intrados face 2a converges towards the extrados face 2b.

Such a ratio d/D allows a high collection efficiency of fine particles. Indeed, the direct passage of the fine particles from the inlet duct 2 to the gas outlet tube 4 is avoided or remains very limited with such a ratio.

The ratio d/D is preferably comprised between 0.1 and 0.15. The ratio d/D is less than 0.15 for an economical pressure drop solution. The ratio d/D is more preferably comprised between 0.11 and 0.13.

Then, the ratio s/S of the inlet duct area s, measured at the tip T of the cyclone separator 1 and perpendicularly to the extrados face 2b, to the cross-sectional area S of the body portion 3 is comprised between 0.24 and 0.32.

Such a ratio s/S makes it possible to have a gas axial mean velocity in the body portion 3 that is higher than 7 m/s. The axial mean velocity can be defined as being the ratio of the gas volume flow to the cross-sectional area S of the body portion 3.

The ratio s/S is higher to 0.24, in order to avoid any excessive pressure drop across the cyclone separator 1. The ratio s/S is less than 0.32, in order to allow a high velocity of the particles and to facilitate the respect of the d/D ratio.

The ratio s/S is preferably comprised between 0.26 and 0.30, and more preferably between 0.27 and 0.29.

Last, the ratio of the height h of the inlet duct 2 to the width w of the inlet duct 2 at the tip T of the cyclone separator 1 does not exceed 4.

This ratio allows an economical inlet duct.

The height h of the inlet duct 2 is preferably not higher than the internal diameter D of the body portion 3, which limits the height of the cyclone body portion 3.

The height H of the body portion 3 is preferably less than 1.2D, and more preferably less than 1.1D, D being the internal diameter of the body portion 3. This height is very advantageous since it provides low cyclone separator surface, weight and dimensions, which reduces the cost of the steel support structures. Moreover, the low height of the cyclone separator 1 facilitates the arrangement of a fluidized bed heat exchanger, if needed.

In order to improve the cyclone separator efficiency, the orifice of the vortex finder 4 is preferably not centred at the centre of the body portion 3. Thus, the distance l between the projection of the body portion 3 centre on a perpendicular to the extrados face 2b and the projection of the gas outlet tube 4 lower extremity centre on a perpendicular to the extrados face 2b can be comprised between 0.04D and 0.08D, D being the internal diameter of the body portion 2, as shown in FIG. 2.

In order to improve the cyclone separator efficiency, the ratio of the cross-sectional area a of the gas outlet tube 4 lower extremity to the cross-sectional area S of the body portion 3 can be comprised between 0.13 and 0.20, more preferably between 0.15 and 0.20.

The gas outlet tube 4 can comprise a lower conical portion and an upper cylindrical portion. Thus, the pressure drop in the gas outlet tube 4 is reduced compared to the pressure drop of a system having the same constant minimum section. The gas outlet tube 4 can be designed at least partly conically, the inlet orifice of the gas outlet tube 4 having the lower section and the upper part of the gas outlet tube 4 being a cylinder with a greater section. In this case, the diameter ($D_v$) of the cylindrical portion and the diameter ($d_v$) at the lower part of the conical portion can be such that $D_v - d_v < 0.3L$, L being the height of the conical portion of the gas outlet tube 4.

Figure 3:
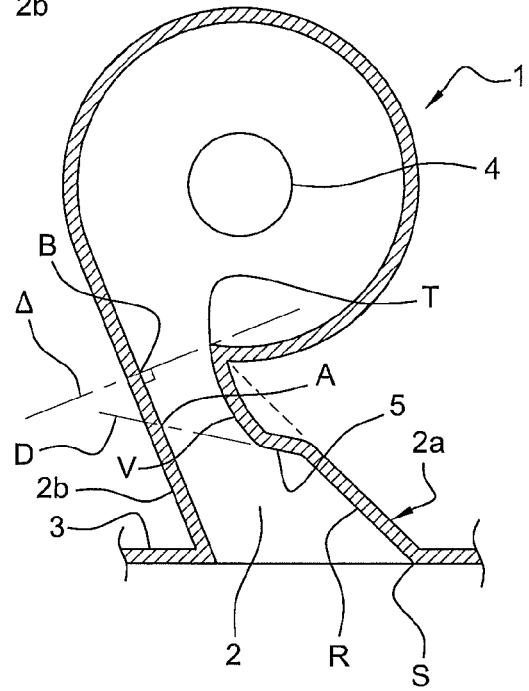
FIG. 3 shows a cyclone separator according to the invention with a specific inlet duct.

The inlet duct 2 can be an inlet duct disclosed in EP 1020229, as shown in FIG. 3. For instance, the intrados face 2a ending at the tip T of the cyclone separator 1, said intrados face 2a which connects the starting point S of the inlet duct 2 to the point T at the tip of the cyclone separator 1 may have a profile such that it comprises at least two distinct tangents so that one D intersects the extrados face 2b at a point A located upstream of the foot B of the perpendicular to the extrados 2b taken from the tip T of the cyclone separator 1, and said intrados face 2a may start from said point S by a first part having a rectilinear profile R, followed by a second part having a curved profile V with a point of inflection 5 or else by a second rectilinear part which meets the tip T of the cyclone separator 1, said point S being located at the exit from the furnace.

The intrados face 2a can have a first part having a rectilinear profile that is followed by a second rectilinear part and the rectilinear profile of the first part can make with the extrados face an angle comprised between 25° and 35°, as shown in FIG. 2. Thus, the pressure drop in the inlet duct 2 is reduced.

The cyclone separator according to the invention accepts a body axial velocity of 8 to 10 m/s with same capture efficiency than proven current efficient cyclones operating at 5 to 6 m/s while keeping acceptable pressure losses. Moreover, an economical design is provided since the cyclone size is reduced. The cyclone separator is suitable for circulating fluidized bed boilers which are able to support the duty of separating solids that can be abrasive and which flow in a high amount of entrained solids compared to the gas flow (for instance for entrained solids quantity around or above 3 kg per m³ gas). The cyclone separator can have a large flow capacity and may have an internal diameter of 5 m and more.

What is claimed is:

1. A cyclone separator for particle collection from a gas stream containing entrained solid particles, said cyclone separator comprising:
    a cylindrical-shaped body portion,
    an inlet duct having an intrados face and an extrados face, said inlet duct in fluid communication to the body portion,
    a gas outlet tube in fluid communication with the body portion, the gas outlet tube disposed at an upper end of the body portion,
    wherein:
        a ratio (d/D) is greater than or equal to 0.1,
            wherein (d) is defined as a distance between a parallel to the extrados face extending from a tip of the cyclone separator and the closest point of the gas outlet tube, said distance (d) being measured at a lower extremity of the gas outlet tube, and
        (D) is defined as an internal diameter (D) of the body portion;
        a ratio (s/S) is between 0.24 and 0.32,
            wherein (s) is defined as an inlet duct area measured at the tip of the cyclone separator extending perpendicular to the extrados face, and
            (S) is defined as a cross-sectional area of the body portion; and
        a ratio (h/w) is less than 4,
            wherein (h) is defined as a height of the inlet duct, and
            (w) is defined as a width of the inlet duct at the tip of the cyclone separator;
    wherein the intrados face comprises:
        at least two distinct tangents so that a first tangent intersects the extrados face at a point located upstream of a foot, wherein the foot is defined as a perpendicular to the extrados face taken from the tip of the cyclone separator, and
        from the starting point of the inlet duct, said intrados face further comprises:
            a first part having a rectilinear profile, said first part disposed proximate to a starting point of the inlet duct,
            a second part having a curved profile, said second part proximate to the tip of the cyclone separator, and
            a third part, said third part disposed between the starting point and the tip, said third part connects together said first and second parts,
        wherein said third art comprises a profile having a point of inflection.

2. The cyclone separator according to claim 1, wherein a distance (1) is between 0.04D and 0.08D,
    wherein (1) is defined as the distance between a projection of a center of the body portion on a perpendicular to the extrados face and a projection of a center of the gas outlet tube lower extremity on a perpendicular to the extrados face.

3. The cyclone separator according to claim 1, wherein a ratio (a/S) is between 0.13 and 0.20,
    wherein (a) is defined as a cross-sectional area of the gas outlet tube lower extremity.

4. The cyclone separator according to claim 1, wherein a height (h) of the inlet duct does not exceed the internal diameter (D) of the body portion.

5. The cyclone separator according to claim 1, wherein a height (H) of the body portion is less than 1.2D.

6. The cyclone separator according to claim 1, wherein the intrados face comprises
    a first part having a rectilinear profile followed by a second rectilinear part,
    wherein the rectilinear profile of the first part forms an angle with the extrados face between 25° and 35°.

7. The cyclone separator according to claim 1, wherein the ratio (h/w) is between 3 and 4.

8. The cyclone separator according to claim 1, wherein the ratio (h/w) is between 3.5 and 4.

9. The cyclone separator according to claim 1, wherein a center of the gas outlet tube is offset from a center of the cylindrical-shaped body portion.

10. The cyclone separator according to claim 1, wherein the gas outlet tube comprises a lower conical portion and an upper cylindrical portion.

11. The cyclone separator according to claim 10, wherein a diameter ($D_v$) of the cylindrical portion and a diameter ($d_v$)

at the lower part of the conical portion are such that $0 \leq D_v - d_v < 0.3L$, L being the height of the conical portion of the gas outlet tube.

12. A cyclone separator for particle collection from a gas stream containing entrained solid particles, said cyclone separator comprising:
   a cylindrical-shaped body portion,
   an inlet duct having an intrados face and an extrados face, said inlet duct in fluid communication to the body portion,
   a gas outlet tube in fluid communication with the body portion, the gas outlet tube disposed at an upper end of the body portion,
   wherein:
      a ratio (d/D) is between 0.1 and 0.2,
         wherein (d) is defined as a distance between a parallel to the extrados face extending from a tip of the cyclone separator and the closest point of the gas outlet tube, said distance (d) being measured at a lower extremity of the gas outlet tube, and
         (D) is defined as an internal diameter (D) of the body portion;
      a ratio (s/S) is between 0.24 and 0.32,
         wherein (s) is defined as an inlet duct area measured at the tip of the cyclone separator extending perpendicular to the extrados face, and
         (S) is defined as a cross-sectional area of the body portion; and
      a ratio (h/w) is less than 4,
         wherein (h) is defined as a height of the inlet duct, and
(w) is defined as a width of the inlet duct at the tip of the cyclone separator;
   wherein the intrados face comprises:
      at least two distinct tangents so that a first tangent intersects the extrados face at a point located upstream of a foot, wherein the foot is defined as a perpendicular to the extrados face taken from the tip of the cyclone separator, and
      from the starting point of the inlet duct, said intrados face further comprises:
         a first part having a rectilinear profile, said first part disposed proximate to a starting point of the inlet duct,
         a second part having a curved profile, said second part proximate to the tip of the cyclone separator, and
         a third part, said third part disposed between the starting point and the tip, said third part connects together said first and second parts,
      wherein said third art comprises a profile having a point of inflection.

13. The cyclone separator according to claim 12, wherein the ratio (d/D) is between 0.1-0.15.

14. The cyclone separator according to claim 12, wherein a distance (1) is between 0.04D and 0.08D, wherein (1) is defined as the distance between a projection of a center of the body portion on a perpendicular to the extrados face and a projection of a center of the gas outlet tube lower extremity on a perpendicular to the extrados face.

15. The cyclone separator according to claim 12, wherein a ration (a/S) is between 0.13 and 0.20, wherein (a) is defined as a cross-sectional area of the gas outlet tube lower extremity.

16. The cyclone separator according to claim 12, wherein a height (h) of the inlet duct does not exceed the internal diameter (D) of the body portion.

17. The cyclone separator according to claim 12, wherein a height (H) of the body portion is less than 1.2D.

18. The cyclone separator according to claim 12, wherein the gas outlet tube comprises a lower conical portion and an upper cylindrical portion.

* * * * *